(12) United States Patent
Niimi

(10) Patent No.: US 6,971,677 B2
(45) Date of Patent: Dec. 6, 2005

(54) VEHICULAR SEAT BELT SYSTEM

(75) Inventor: Daisuke Niimi, Hamamatsu (JP)

(73) Assignee: Suzuki Motor Corporation, Shizuoka-Ken (JP)

( * ) Notice: Subject to any disclaimer, the term of this patent is extended or adjusted under 35 U.S.C. 154(b) by 238 days.

(21) Appl. No.: 10/428,226

(22) Filed: May 2, 2003

(65) Prior Publication Data
US 2003/0222451 A1    Dec. 4, 2003

(30) Foreign Application Priority Data
May 30, 2002  (JP) .............................. 2002-156547

(51) Int. Cl.[7] .............................................. B60R 22/00
(52) U.S. Cl. .................... 280/801.1; 297/468; 297/482
(58) Field of Search ............................ 280/801.1, 807, 280/808; 297/468, 482, 483, 486

(56) References Cited

U.S. PATENT DOCUMENTS

| | | | | |
|---|---|---|---|---|
| 3,968,978 A | * | 7/1976 | Hayashi | 280/803 |
| 4,392,673 A | * | 7/1983 | Suzuki et al. | 280/804 |
| 4,817,754 A | * | 4/1989 | Muramoto | 180/268 |
| 4,880,254 A | * | 11/1989 | Muller | 280/801.2 |
| 5,590,907 A | | 1/1997 | McQueen, II et al. | 280/801.1 |
| 6,854,766 B2 | * | 2/2005 | Kobayashi | 280/801.1 |
| 6,854,767 B2 | * | 2/2005 | Yakata et al. | 280/808 |

FOREIGN PATENT DOCUMENTS

FR    2 701 906 A1    2/1993

* cited by examiner

Primary Examiner—Paul N. Dickson
Assistant Examiner—Toan C. To
(74) Attorney, Agent, or Firm—Trop, Pruner & Hu, P.C.

(57) ABSTRACT

The present invention provides a vehicular seat belt system which provides excellent assembling properties and good appearance. The configuration is such that in a vehicular seat belt system in which a takeout hole 9 for pulling a seat belt 8 out of a seat belt retractor 7 provided on a vehicle body 1 into the cabin side is formed in a cabin trim 5, the takeout hole 9 for the seat belt 8 is formed near a part mounting hole 16 formed in the cabin trim 5, and a slit 19 is formed so as to connect the part mounting hole 16 to the takeout hole 9 for the seat belt 8.

9 Claims, 10 Drawing Sheets

FIG.9 (a)
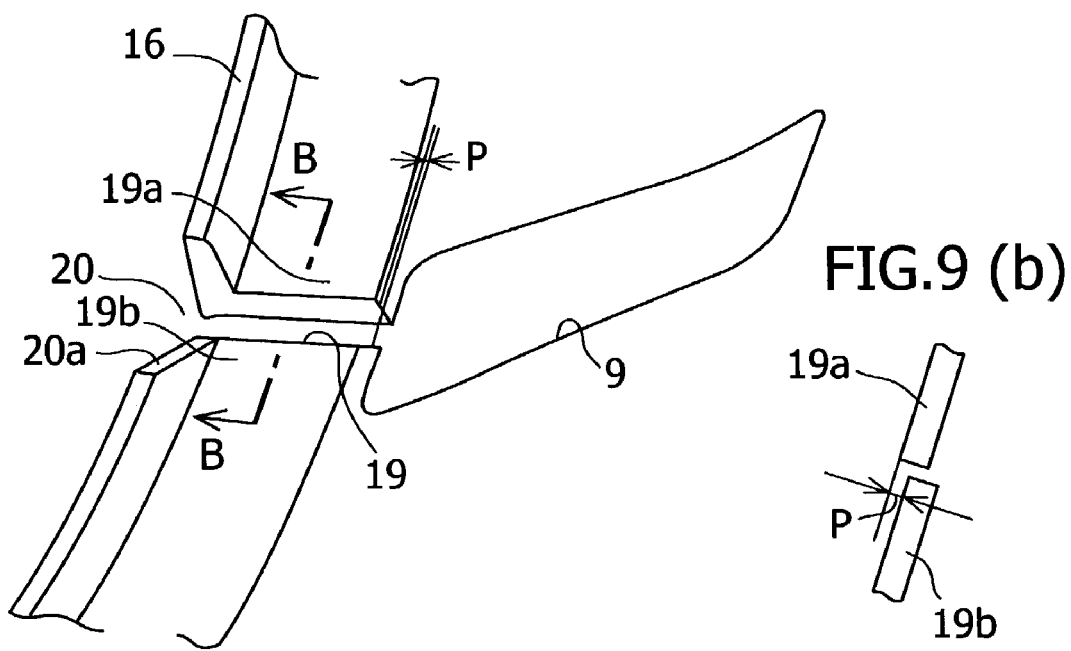
FIG.9 (b)
FIG.10
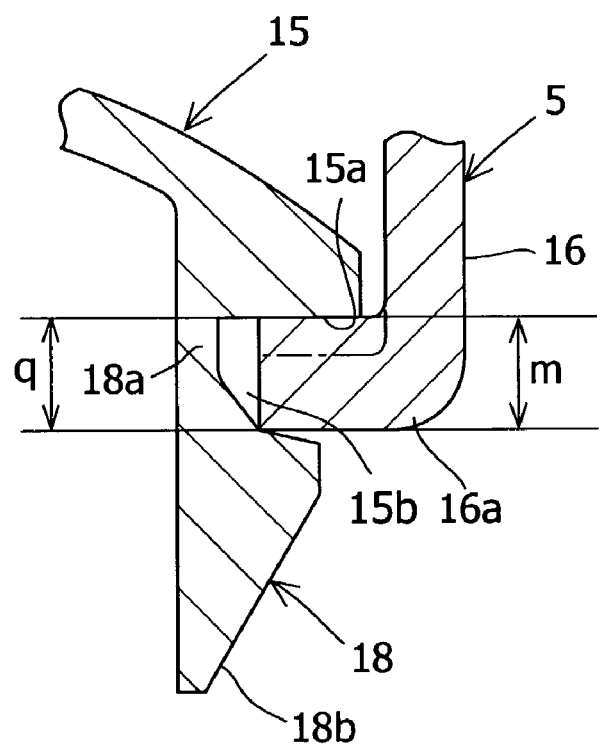

VEHICULAR SEAT BELT SYSTEM

FIELD OF THE INVENTION AND RELATED ART STATEMENT

The present invention relates to a lap and diagonal seat belt used mainly in the center of rear seat of a motor vehicle and, more particularly, to a vehicular seat belt system capable of improving the assembling properties of a seat belt when the seat belt system is assembled.

Generally, in a front seat and a rear seat of the motor vehicle, a lap and diagonal seat belt system is mainly provided to restrain a passenger on the seat.

In a three-passenger seat, in order to use the lap and diagonal seat belt system in the center seat, a through ring of a seat belt anchor is installed to a roof portion.

FIGS. 13 and 14 show a conventional lap and diagonal seat belt system which is used in the center seat. In this seat belt system, a seat belt retractor 103 is incorporated in a quarter pillar portion (also called a rear pillar portion) 102 formed by a side body outer panel 100 and an inner panel 101, and a seat belt 104 pulled out of the seat belt retractor 103 is pulled out slantwise downward via a through ring (also called a sash guide) 106 attached to a roof portion 105. At the tip end of the seat belt 104, a connector 107 is mounted as a first connecting member, and at an intermediate portion thereof, a seat belt tongue plate 108 is mounted as a second connecting member. Also, on both sides of the center seat, a first fixing member 110 for fixing the connector 107 and a second fixing member 111 for fixing the seat belt tongue plate 108 are provided. The seat belt system is used by fixing the connector 107 to the fixing member 110 and fixing the tongue plate 108 to the fixing member 111.

In such a lap and diagonal seat belt system, when the retractor 103 is installed around the quarter pillar portion 102 as shown in FIG. 15, a method has conventionally been used in which the seat belt 104 is caused to pass through a quarter window trim 112 and is taken out of a slit 113 formed at the upper part of the quarter window trim 112. The seat belt 104 pulled out of the slit 113 is supported via a through ring 115 mounted in a roof portion 114. The through ring 115 is installed to a cover 116 mounted in the roof portion 114 by means of a seat belt anchor bolt 117.

In the case where a speaker, harness, lamp, etc. are contained in the quarter window trim 112, however, the seat belt 104 cannot be caused to pass through the quarter window trim 112, and hence this method cannot be used.

In the case where a hole 118 for taking out the seat belt 104 is formed at a halfway position of the quarter window trim 112 as shown in FIG. 16 to solve the above problem, when the seat belt system is assembled, the tongue plate 108, the connector 107, the seat belt anchor bolt 117, and the like must be taken out through the hole 118, so that assembly work is not easy to do. Also, the hole 118 must be large, which mars the appearance. Further, in the case where a slit 119 communicating with the hole 118 is formed so as to be directed toward the rear of the vehicle as shown in FIG. 17, there is a drawback in that the slit 119 is visible when the vehicle is viewed from the rear side, which also mars the appearance.

OBJECT AND SUMMARY OF THE INVENTION

The present invention has been made to solve the above problems, and accordingly an object thereof is to provide a vehicular seat belt system which provides excellent assembling properties and good appearance.

To achieve the above object, the present invention provides a vehicular seat belt system in which a takeout hole for pulling a seat belt out of a seat belt retractor provided on a vehicle body into the cabin side is formed in a cabin trim, wherein the takeout hole for the seat belt is formed near a part mounting hole formed in the cabin trim, and a slit is formed so as to connect the part mounting hole to the takeout hole for the seat belt.

Also, in the present invention, the takeout hole for pulling out the seat belt is formed in the cabin trim at a height position approximately equal to the lower end portion of the part mounting hole and on the rear side of the part mounting hole, and the rear portion of the part mounting hole is connected to the front portion of the takeout hole by the slit.

Further, in the present invention, a notch portion for expanding the opening portion of the slit is formed at the opening end of the slit formed in the part mounting hole.

Still further, in the present invention, a slanting face expanding toward the opening side is formed on the lower end side of the notch portion.

Also, in the present invention, a plurality of fixing portions for installing a part cover for closing the part mounting hole are formed in the peripheral portion of the part mounting hole, and some of the fixing portions are formed on both sides of the slit.

Further, in the present invention, claws are projectingly provided in the peripheral portion of the part cover as an engagement portion so as to be directed toward the part mounting hole, and, of the fixing portions provided around the part mounting hole, the fixing portions on both sides of the slit have a thickness larger than that of other fixing portions.

Still further, in the present invention, claws are projectingly provided in the peripheral portion of the part cover as an engagement portion so as to be directed toward the part mounting hole, and the thickness of the part cover in the base portion of the claw engaging with the fixing portion formed on both sides of the slit is larger than that of other portions.

Also, in the present invention, claws are projectingly provided in the peripheral portion of the part cover as an engagement portion so as to be directed toward the part mounting hole, and padding is provided on the claw engaging with the fixing portion formed on both sides of the slit to fill the gap between the fixing portion provided around the part mounting hole and the peripheral portion of the part mounting hole.

According to the present invention, when the seat belt is assembled, a seat belt tongue plate, connector, seat belt anchor bolt, and the like have only to be introduced into the cabin side from the part mounting hole, and only the seat belt has to be shifted to the takeout hole for the seat belt through the slit, so that assembling properties are excellent, and the appearance is good because it cannot be seen from the rear of the vehicle. Also, the slit width has only to be a width corresponding to the thickness of seat belt, so that appearance is improved.

BRIEF DESCRIPTION OF THE DRAWINGS

FIG. 9 (a) is a schematic perspective view taken in the direction of arrow Y of FIG. 5;

FIG. 9 (b) is a sectional view taken along the line B—B of FIG. 9 (a);

FIG. 10 is an enlarged sectional view of the same portion as shown in a sectional view taken along the line A—A of FIG. 3, showing another embodiment of the present invention;

DETAILED DESCRIPTION OF PREFERRED EMBODIMENTS

Embodiments of a vehicular seat belt system in accordance with the present invention will now be described in detail with reference to the accompanying drawings.

Figure 1:
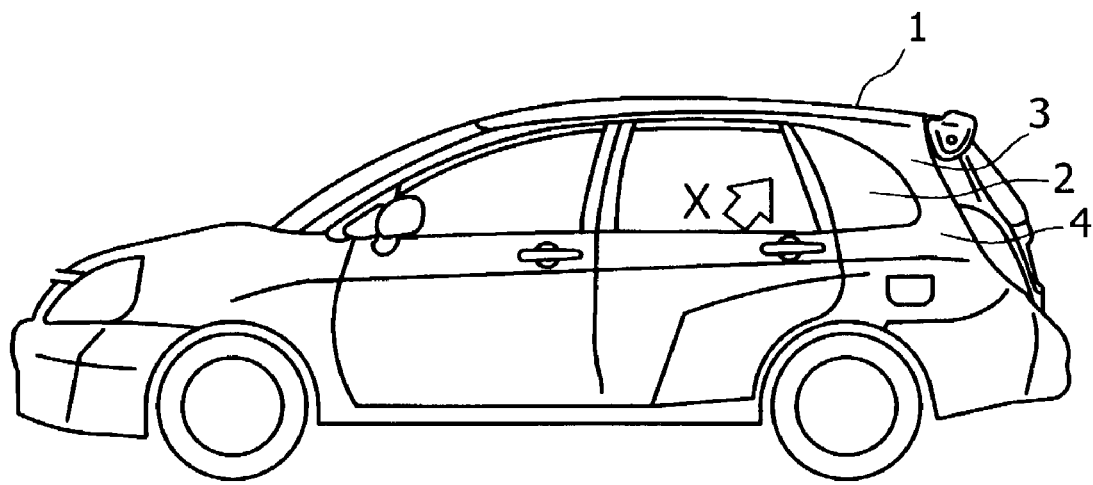
FIG. 1 is a side view of a vehicle body to which a vehicular seat belt system in accordance with the present invention is applied.
Figure 2:
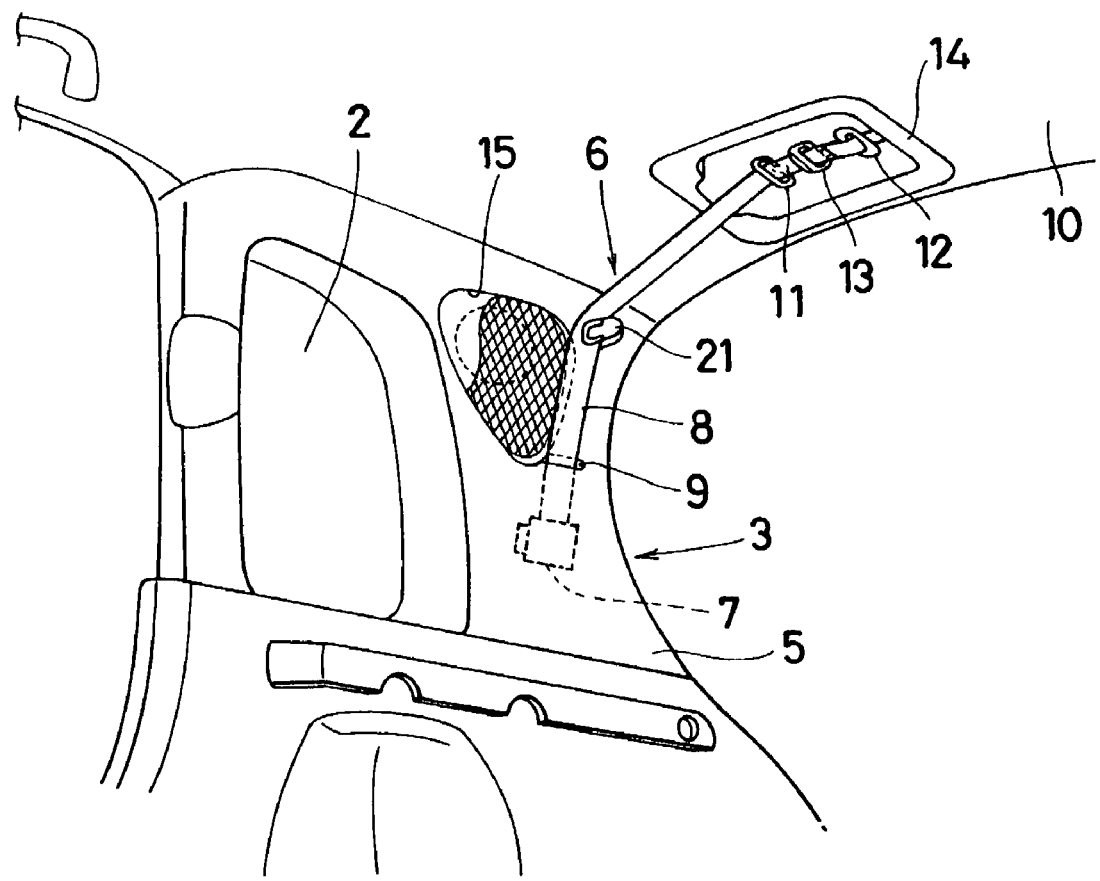
FIG. 2 is a perspective view taken in the direction of arrow X of FIG. 1, showing an embodiment of a seat belt system in accordance with the present invention.

In FIGS. 1 and 2, a quarter pillar portion (also called a rear pillar portion) 3 is provided on the rear side of a quarter window 2 of a vehicle body 1. This quarter pillar portion 3 is formed on the rear side of the quarter window 2 by a side body outer panel 4 and a quarter inner panel (not shown), and on the cabin side of the quarter inner panel, a quarter window trim 5 is assembled as a cabin trim with clips or the like.

In the quarter pillar portion 3, there is provided a seat belt retractor 7 of a lap and diagonal seat belt system 6 used for the center seat of rear seat. A seat belt 8 pulled out of the retractor 7 is introduced into the cabin side through a takeout hole 9 formed in the quarter inner trim 5.

For the seat belt 8 introduced into the cabin side, a connector 12 provided at the tip end of the seat belt 8 and a through tongue 13 are hung through a sash guide 11 attached to a roof portion 10 with a seat belt anchor bolt, described later. In the roof portion 10 in which the sash guide 11 is provided, a seat belt storage cover 14 is provided. The connector 12 and the through tongue 13 are held in the seat belt storage cover 14 when they are not in use.

Figure 3:
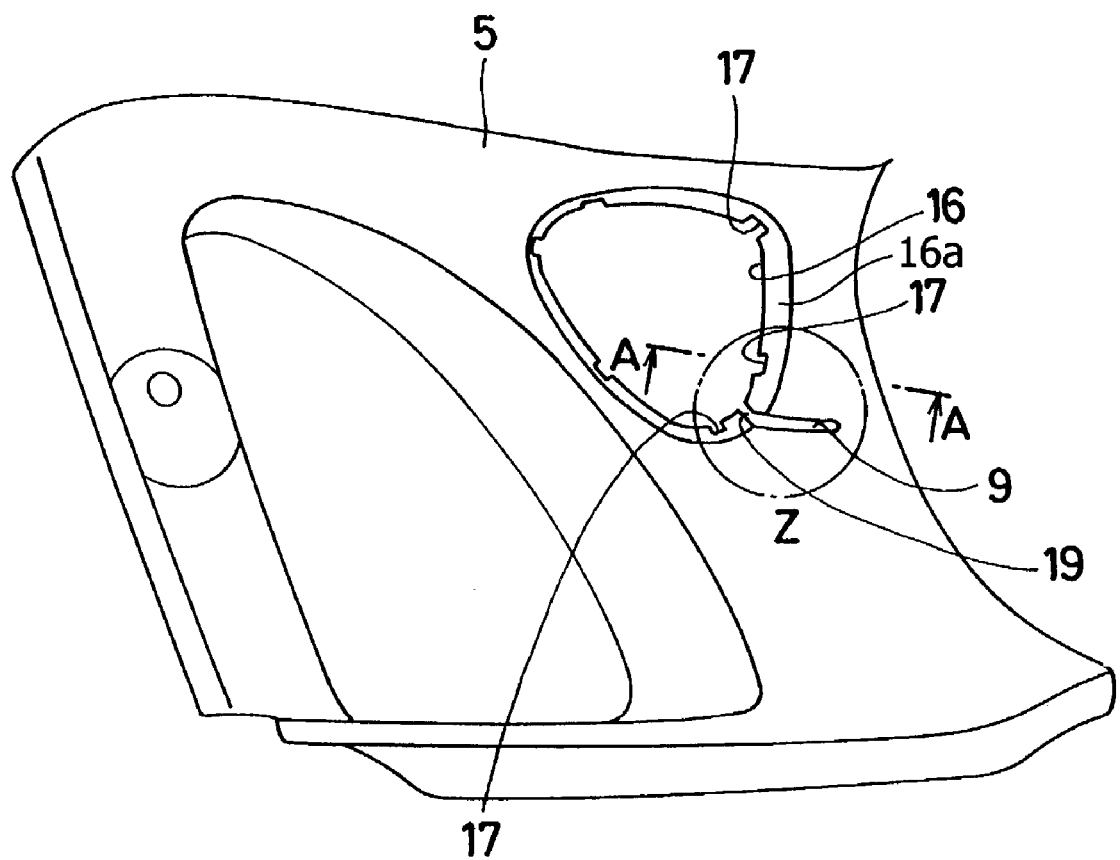
FIG. 3 is a front view of a quarter window trim shown in FIG. 2.
Figure 4:
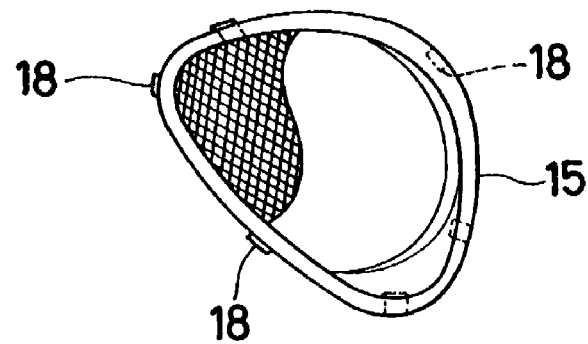
FIG. 4 is a perspective view of a speaker cover shown in FIG. 2.
Figure 5:
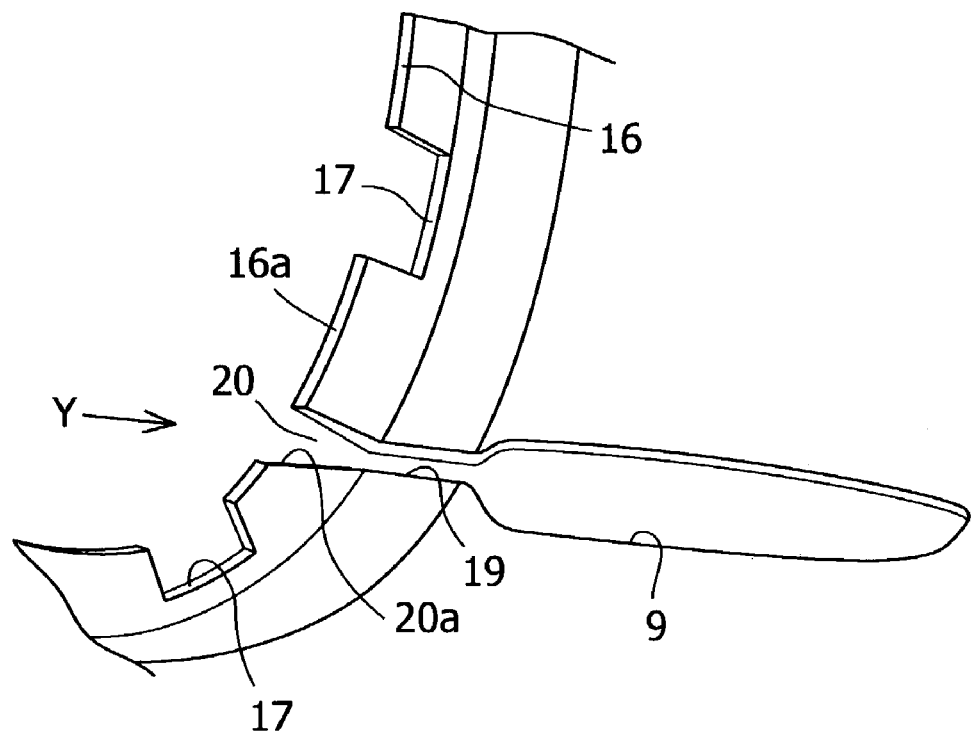
FIG. 5 is a partially enlarged view of a slit portion shown in FIG. 3.
Figure 6:
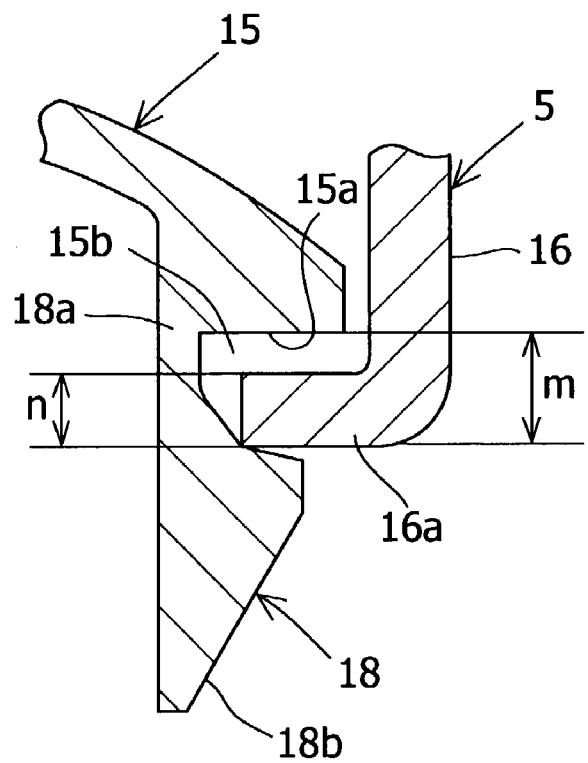
FIG. 6 is a sectional view taken along the line A—A of FIG. 3.

As shown in FIGS. 3 to 5, the quarter window trim 5 in the quarter pillar portion 3 is formed with a speaker cover mounting hole (part cover mounting hole) 16 for attaching a speaker cover (part cover) 15. In a peripheral portion 16a of the speaker cover mounting hole 16, notch grooves 17 are formed at predetermined intervals as fixing portions, and claws 18 engaging with the notch grooves 17 are provided on the back surface of the speaker cover 15 at predetermined intervals so as to protrude toward the speaker cover mounting hole 16. As shown in FIG. 6, the claw 18 of the speaker cover 15 is formed by an arm portion 18a projecting from the back surface of the speaker cover 15 and a claw-shaped portion 18b formed at the tip end of the arm portion 18a so as to protrude toward the outside to form an engagement portion. A gap 15b with a fixed width m is formed between the claw-shaped portion 18b and a back surface side wall portion 15a of the speaker cover 15. The width m of the gap 15b is formed so as to be greater than a thickness n of a peripheral portion 16a of the speaker cover mounting hole 16.

The takeout hole 9 for the seat belt 8 is formed at the rear of the lower part of the speaker cover mounting hole 16. At the rear of the lower part of the speaker cover mounting hole 16, there is formed a slit 19 communicating with the takeout hole 9 for the seat belt 8. This slit 19 is formed so as to have a width such that the seat belt can pass through, and also at the opening end of the slit 19 on the speaker cover mounting hole side, there is formed a notch portion 20 in which the opening portion of the slit 19 expands. On the lower end side of the notch portion 20 of the slit 19 is formed a slanting face 20a expanding toward the opening side (see FIG. 5). On the opening end side of the slit 19, the notch grooves 17 are provided on the opposite sides of the slit 19 (see FIGS. 3 and 5).

Reference numeral 21 denotes a seat belt holder for holding the seat belt 8 in the quarter pillar portion 3 when the seat belt 8 is not in use.

The following is a description of a procedure for assembling the seat belt 8.

Figure 7:
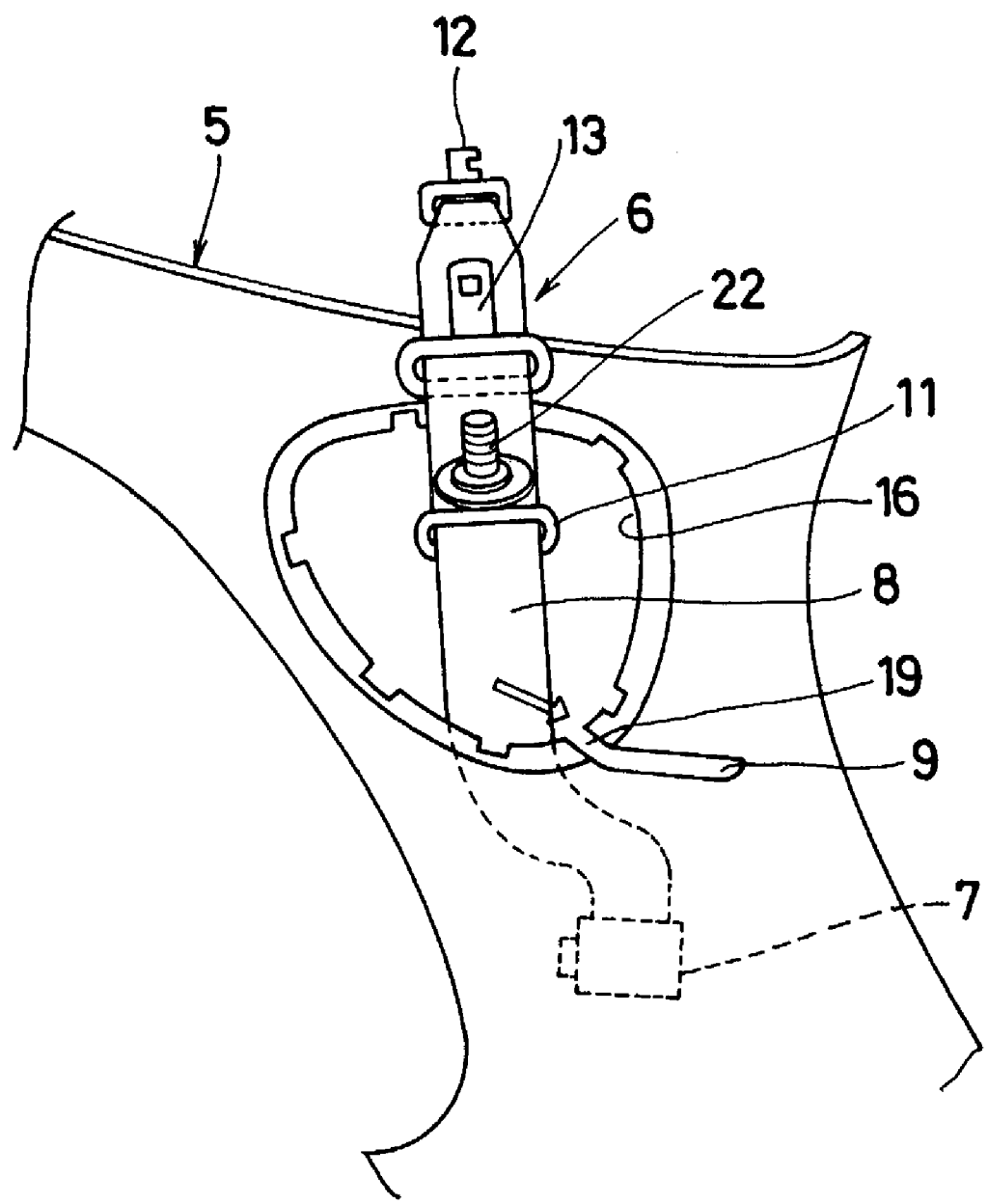
FIG. 7 is a schematic view showing a procedure for assembling a seat belt.
Figure 8:
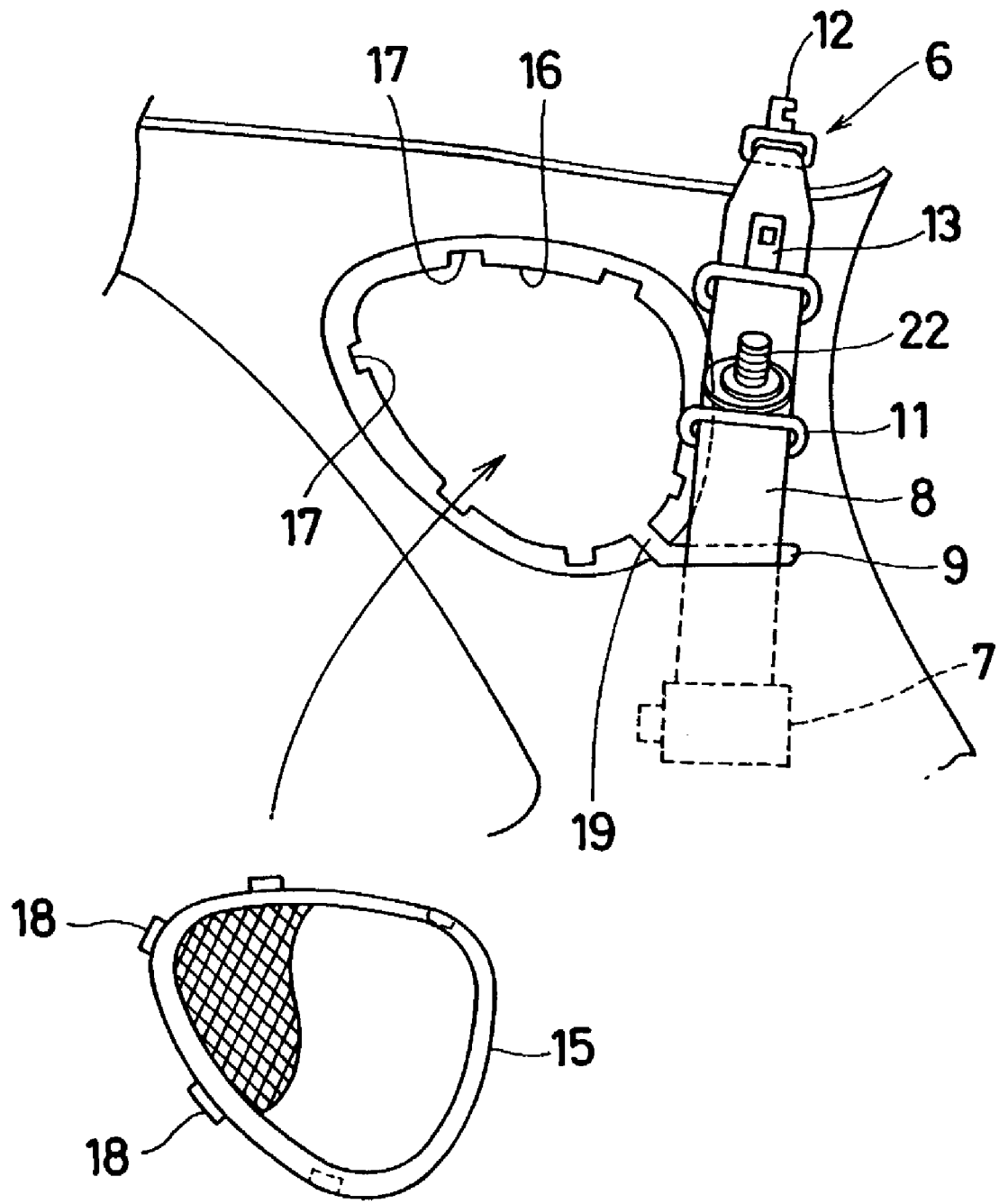
FIG. 8 is a schematic view showing a procedure for assembling a seat belt and a speaker cover.

As shown in FIG. 7, the seat belt 8 is pulled out of the retractor 7 of the lap and diagonal seat belt system 6 assembled to the quarter inner panel, and the sash guide 11 and the seat belt anchor bolt 22 are pulled into the cabin side through the speaker cover mounting hole 16, together with the connector 12 provided at the tip end of the seat belt 8 and the through tongue 13. Then, the seat belt 8 is introduced into the takeout hole 9 through the slit 19 (see FIG. 8). Since the notch portion 20 having the slanting face 20a on the lower end side is formed at the opening end of the slit 19 on the speaker cover mounting hole side, the seat belt 8 can be caused to pass through to the takeout hole 9 easily.

Then, the seat belt anchor bolt 22 is fixed to the roof portion 10, by which the lap and diagonal seat belt system 6 is assembled. To the speaker cover mounting hole 16, the speaker cover 15 is assembled by engaging the claws 18 with the notch grooves 17.

According to the above-described embodiment, since the speaker cover mounting hole 16 and the takeout hole 9 for the seat belt 8 are connected to each other via the slit 19, the seat belt 8 can be arranged in the takeout hole 9 through the slit 19. The takeout hole 9 need not be enlarged more than necessary. Also, since the speaker cover 15 is attached to the speaker cover mounting hole 16 after the lap and diagonal seat belt system 6 has been assembled, the opening end of the slit 19 is invisible from the outside, so that the appearance can be improved.

FIGS. 9 and 10 show another embodiment of the present invention. In these figures, the same reference numerals are applied to the same elements shown in FIGS. 5 and 6, and explanation of the same elements is omitted.

FIG. 9 (a) is a perspective view taken in the direction of arrow Y of FIG. 5. In the upper and lower portions 19a and 19b of the slit 19 formed in the quarter window trim 5, a level difference p is sometimes produced by thermal distortion etc., as shown in FIG. 9 (b). Therefore, as shown in FIG. 10, the thickness of the peripheral portion 16a of the speaker cover mounting hole 16 in the quarter window trim 5 is increased so that the thickness q of the peripheral portion 16a is approximately equal to the width m of the gap 15b. If the claw 18 is engaged with the notch groove 17 in this state, the level difference p between the upper and lower portions 19a and 19b of the slit 19 is eliminated because the thickness q of the peripheral portion 16a is approximately equal to the width m of the gap 15b.

Figure 11:
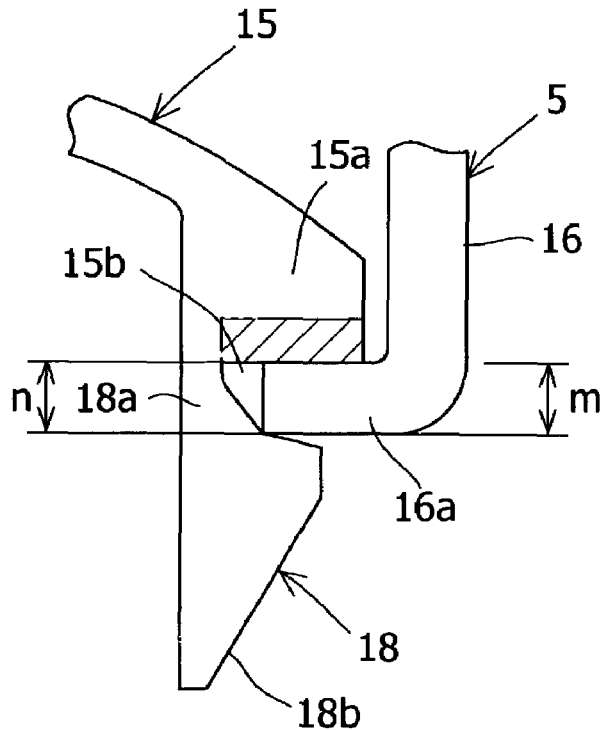
FIG. 11 is an enlarged sectional view of the same portion as shown in a sectional view taken along the line A—A of FIG. 3, showing still another embodiment of the present invention.
Figure 12:
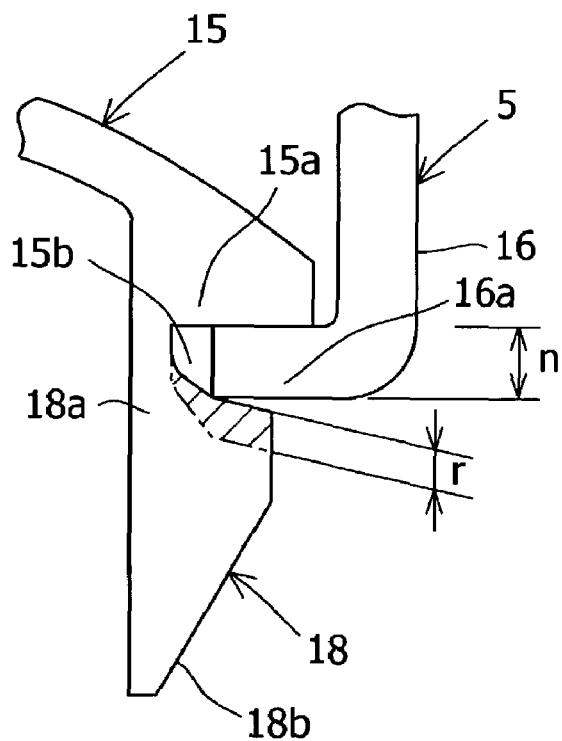
FIG. 12 is an enlarged sectional view of the same portion as shown in the sectional view taken along the line A—A of FIG. 3, showing still another embodiment of the present invention.
Figure 13:
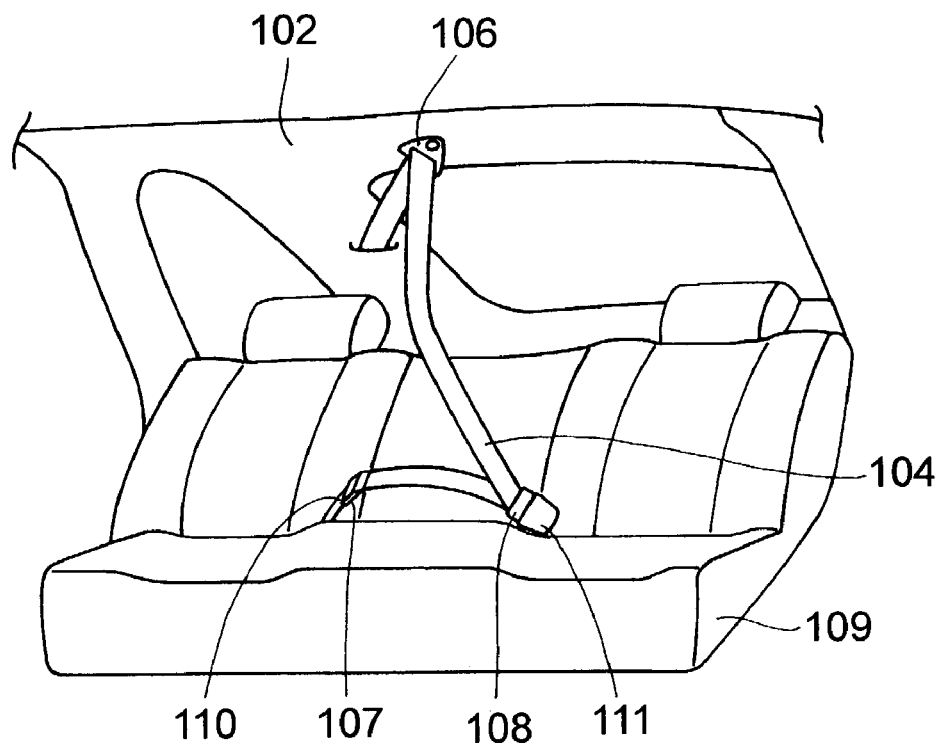
FIG. 13 is a perspective view of a conventional lap and diagonal seat belt system for a center seat.
Figure 14:
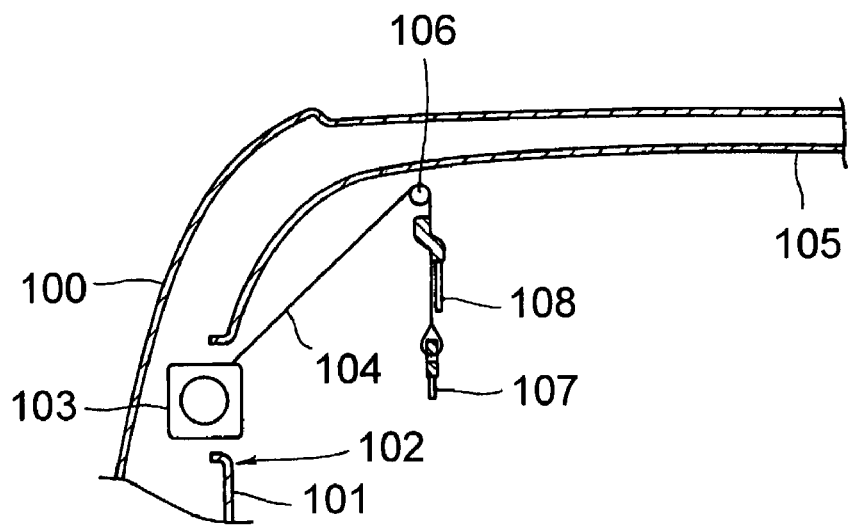
FIG. 14 is a sectional view of a conventional lap and diagonal seat belt system.
Figure 15:
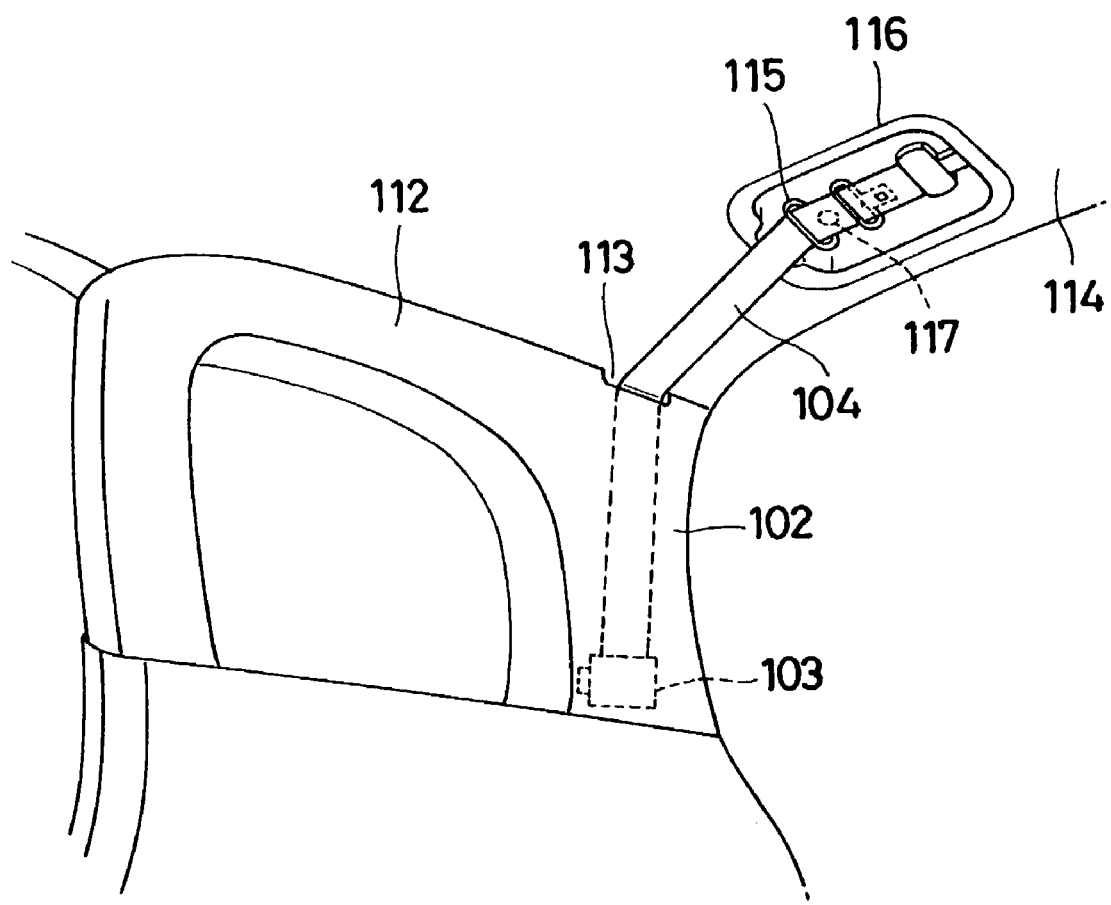
FIG. 15 is a perspective view showing a construction for pulling out a seat belt of a conventional lap and diagonal seat belt system for a center seat.
Figure 16:
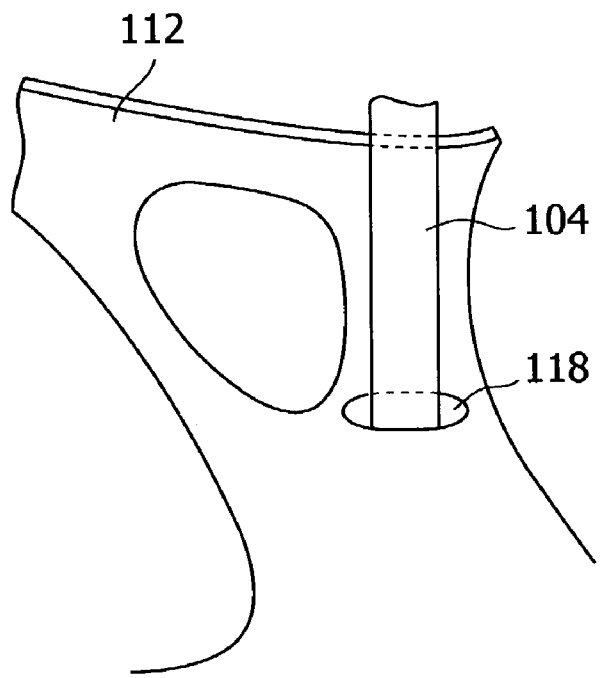
FIG. 16 is a schematic view showing one example of a conventional hole for pulling out a seat belt.
Figure 17:
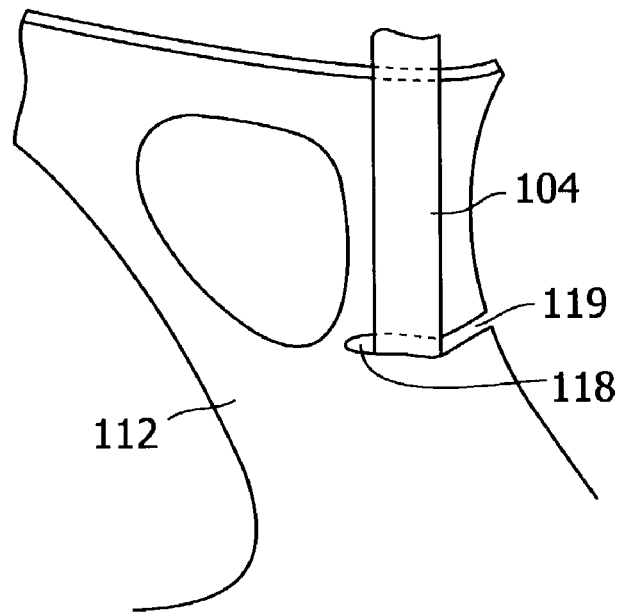
FIG. 17 is a schematic view showing another example of a conventional hole for pulling out a seat belt.

FIGS. 11 and 12 show modifications of the embodiment shown in FIG. 10. In the modification shown in FIG. 11, the thickness of the back surface side wall portion 15a of the speaker cover 15 is increased so that the width m of the gap 15b is approximately equal to the thickness n of the peripheral portion 16a. If the claw 18 is engaged with the notch groove 17 in this state, the level difference p between the upper and lower portions 19a and 19b of the slit 19 is eliminated because the thickness n of the peripheral portion 16a is approximately equal to the width m of the gap 15b.

In the modification shown in FIG. 12, padding of a fixed width r is provided on the claw-shaped portion 18b of the speaker cover mounting hole 16 so that the width m of the gap 15b between the padding and the back surface side wall portion 15a of the speaker cover 15 is approximately equal to the thickness n of the peripheral portion 16a of the speaker cover mounting hole 16. If the claw 18 is engaged with the notch groove 17 in this state, the level difference p between the upper and lower portions 19a and 19b of the slit 19 is eliminated because the thickness n of the peripheral portion 16a of the speaker cover mounting hole 16 is approximately equal to the width m of the gap 15b between the padding and the back surface side wall portion 15a of the speaker cover 15.

The present invention is not limited to the above-described embodiments. It is a matter of course that changes and modifications can be made appropriately without departing from the spirit and scope of the present invention. For example, although the slit 19 is formed between the speaker cover mounting hole 16 and the takeout hole 9 for the seat belt 8 in the above-described embodiments, this configuration may be applied to a mounting hole for mounting another part.

As described above, the vehicular seat belt system in accordance with the present invention can achieve the effects described below.

In the vehicular seat belt system in which the takeout hole for pulling the seat belt out of the seat belt retractor provided on the vehicle body into the cabin side is formed in the cabin trim, the takeout hole for the seat belt is formed near the part mounting hole formed in the cabin trim, and the slit is formed so as to connect the part mounting hole to the takeout hole for the seat belt. Therefore, when the seat belt is assembled, the seat belt tongue plate, connector, seat belt anchor bolt, and the like have only to be introduced into the cabin side from the part mounting hole, and only the seat belt has only to be shifted to the takeout hole for the seat belt through the slit, so that the assembling property is high, and the appearance is good because of invisibility from the rear of the vehicle. Also, the slit width has only to be a width corresponding to the thickness of seat belt, so that the appearance is improved.

The takeout hole for pulling out the seat belt is formed in the cabin trim at a height position approximately equal to the lower end portion of the part mounting hole and on the rear side of the part mounting hole, and the rear portion of the part mounting hole is connected to the front portion of the takeout hole by the slit. Therefore, the part mounting hole can be covered by the part cover, so that the appearance is good.

The notch portion for expanding the opening portion of the slit is formed at the opening end of the slit formed in the part mounting hole. Therefore, the seat belt can be inserted into the slit easily.

The slanting face expanding toward the opening side is formed on the lower end side of the notch portion. Therefore, the seat belt can be inserted into the slit easily, and there is no fear of damaging the seat belt.

A plurality of fixing portions for installing the part cover for closing the part mounting hole are formed in the peripheral portion of the part mounting hole, and some of the fixing portions are formed on both sides of the slit. Therefore, the installation of the part cover can absorb the gap of slit, the level difference, etc., so that the appearance can be improved.

The claws are projectingly provided in the peripheral portion of the part cover as the engagement portion so as to be directed toward the part mounting hole, and, of the fixing portions provided around the part mounting hole, the fixing portions on both sides of the slit have a thickness larger than that of other fixing portions. Therefore, the level difference produced between the upper and lower portions of the slit by thermal distortion can be eliminated by the installation of the part cover, so that the appearance can be improved.

The claws are projectingly provided in the peripheral portion of the part cover as the engagement portion so as to be directed toward the part mounting hole, and the thickness of the part cover in the base portion of the claw engaging with the fixing portion formed on both sides of the slit is larger than that of other portions. Therefore, the level difference produced between the upper and lower portions of the slit by thermal distortion can be eliminated by the installation of the part cover, so that the appearance can be improved.

The claws are projectingly provided in the peripheral portion of the part cover as the engagement portion so as to be directed toward the part mounting hole, and padding is provided on the claw engaging with the fixing portion formed on both sides of the slit to fill the gap between the fixing portion provided around the part mounting hole and the peripheral portion of the part mounting hole. Therefore, the level difference produced between the upper and lower portions of the slit by thermal distortion can be eliminated by the installation of the part cover, so that the appearance can be improved.

What is claimed is:

1. A vehicular seat belt system comprising a takeout hole for pulling a seat belt out of a seal belt retractor provided on a vehicle body into a cabin side is formed in a cabin trim the seat belt is located near a part mounting hole formed in said cabin trim, and a slit is formed so as to connect said part mounting hole to said takeout hole for the seat belt, wherein said takeout hole for pulling out said seat belt is formed in said cabin trim at a height position approximately equal to the lower end portion of said part mounting hole and on the rear side of said part mounting hole formed in said cabin trim, and the rear portion of said part mounting hole is connected to the front portion of said takeout hole by said slit.

2. The vehicular seat belt system according to claim 1, wherein a notch portion for expanding the opening portion of said slit is formed at the opening end of said slit formed in said part mounting hole.

3. The vehicular seat belt system according to claim 2, wherein a slanting face expanding toward the opening side is formed on the lower end side of said notch portion.

4. The vehicular seat belt system according to claim 1, wherein claws are projectingly provided in the peripheral portion of said part cover as an engagement portion so as to be directed toward said part mounting hole, and, of said fixing portions provided around said part mounting hole, the fixing portions on both sides of said slit have a thickness larger than that of other fixing portions.

5. The vehicular seat belt system according to claim 1, wherein claws are projectingly provided in the peripheral portion of said part cover as an engagement portion so as to be directed toward said part mounting hole, and the thickness of said part cover in the base portion of the claw engaging with the fixing portion formed on both sides of said slit is larger than that of other portions.

6. The vehicular seat belt system according to claim 1, wherein claws are projectingly provided in the peripheral portion of said part cover as an engagement portion so as to be directed toward said part mounting hole, and padding is provided on the claw engaging with the fixing portion formed on both sides of said slit to fill the gap between the fixing portion provided around the part mounting hole and the peripheral portion of said part mounting hole.

7. A vehicular seat belt system comprising a takeout hole for pulling a seat belt out of a seat belt retractor provided on a vehicle body into the cabin side is formed in a cabin trim, wherein said takeout hole for the seat belt is formed near a part mounting hole formed in said cabin trim; a slit is formed so as to connect said part mounting hole to said takeout hole for the seat belt; a plurality of fixing portions for installing a part cover for closing said part mounting hole are formed in the peripheral portion of said part mounting hole; and some of said fixing portions are formed on both sides of said slit.

8. A vehicular seat belt system comprising a takeout hole for pulling a seat belt out of a seat belt retractor provided on a vehicle body into the cabin side is formed in a cabin trim, wherein said takeout hole for the seat belt is located near an other part mounting hole formed in said cabin trim; a slit is formed so as to connect said other part mounting hole to said takeout hole for the seat belt; and said slit is covered with an other part cover.

9. The system of claim 8 wherein said other part cover is a speaker cover.

* * * * *